United States Patent [19]

Amort et al.

[11] 4,118,540

[45] Oct. 3, 1978

[54] USE OF SILANES HAVING CAPPED FUNCTIONAL GROUPS AS ADHESIVIZING AGENTS

[75] Inventors: Jürgen Amort, Troisdorf-Sieglar; Heinz Nestler, Troisdorf-Eschmar, both of Germany

[73] Assignee: Dynamit Nobel Aktiengesellschaft, Troisdorf Bez. Cologne, Germany

[21] Appl. No.: 755,876

[22] Filed: Dec. 30, 1976

[30] Foreign Application Priority Data

Dec. 31, 1975 [DE] Fed. Rep. of Germany ....... 2559259

[51] Int. Cl.$^2$ ............................................. B32B 15/08
[52] U.S. Cl. ................................. 428/447; 260/340.2; 260/340.9 R; 260/348.41; 260/448.8 R; 427/374 R; 427/383 B; 427/387; 427/388 R; 427/388 C; 428/375; 428/378; 428/391; 428/429; 428/413; 428/457; 428/450

[58] Field of Search ............... 428/447, 391, 429, 450, 428/413, 411, 457, 378, 375; 260/448.8 R, 340.2, 340.9, 348.41; 427/383 B, 374 R, 387, 388 R, 388 C

[56] References Cited

U.S. PATENT DOCUMENTS

| 3,825,567 | 7/1974 | Kotzsch | 260/340.2 |
| 3,922,466 | 11/1975 | Bell | 428/391 |

*Primary Examiner*—Ellis Robinson
*Attorney, Agent, or Firm*—Burgess, Dinklage & Sprung

[57] ABSTRACT

A laminate comprising an inorganic oxidic or metallic surface and a polymer, the laminate having in the region of the interface between inorganic oxidic or metallic surface and the polymer a silane having a capped function group; the use of silanes having capped functional groups as adhesivizing agents especially for use between organic polymers and substances having inorganic oxidic and/or metallic surfaces. Also disclosed is the surface of an inorganic oxidic or metallic surface resistive to corrosion by applying thereto a silane having a capped functional group.

13 Claims, No Drawings

USE OF SILANES HAVING CAPPED FUNCTIONAL GROUPS AS ADHESIVIZING AGENTS

BACKGROUND OF THE INVENTION

1. Field Of The Invention

This invention relates to the use of silanes having capped functional groups as adhesivizing agents, especially for between organic polymers and substances having inorganic oxidic and/or metal surfaces.

2. Discussion Of The Prior Art

It is known to coat sheet metals or glass fibers or glass fiber fabrics with a variety of organic polymers on one or both sides and thus to prepare laminates of these materials. It has furthermore long been known to use condensation products of the phenol-formaldehyde and amine resin type as binding agents, for example in foundry practice.

However, good adhesion between the organic and the inorganic components cannot be achieved without adhesives, because the anchoring together of the two components at their boundary surfaces without other media is not sufficient to achieve the mechanical characteristics which the materials require. For example, German Pat. No. 1,010,941 described the pretreatment of oxidic material with organic silicon compounds containing vinyl radicals. Furthermore, in German Pat. No. 1,242,358, the use of organosilane compounds containing amino groups is described for this purpose. For many applications, however, the strength of adhesion achieved with these adhesivizing agents is insufficient, or else the transparency is inadequate, especially in glass laminates. It is also desirable for the film on the inorganic, metallic or oxidic surface to be highly resistant to mechanical stress.

It has furthermore been found in practice that, for example, when γ-aminopropyltriethoxysilane is used as the adhesive component, the initially positive adhesivizing effect of the aminosilane becomes ineffectual after relatively long storage in a variety of resins other than furan resins, such as, for example, in phenol resol resins or epoxy resins.

SUMMARY OF THE INVENTION

In accordance with the foregoing the present invention contemplates a process for protecting the surface of an inorganic oxidic or metallic surface against corrosion or for improving its adhesion to an organic polyaddition and/or polycondensation and/or polymerization compound which comprises contacting said surface with a silane having a capped functional group.

This invention is also directed to a treated object having an inorganic, oxidic or metallic surface, said object having on said surface a coating of a silane having a capped functional group.

Also contemplated herein is a laminate comprising an inorganic oxidic or metallic surface and a polymer, said laminate having in the region of the interface between the inroganic oxidic or metallic surface and the polymer a silane having a capped functional group.

The term, "silanes containing capped functional groups," as used herein, refers to compounds of the following formulas:

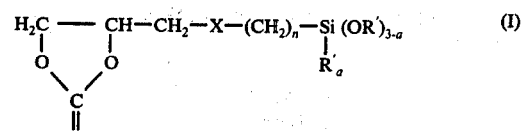

and

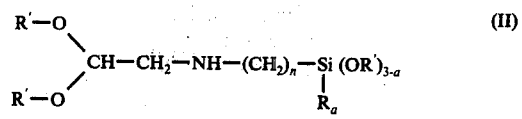

wherein $n$ can be from 1 to 8, preferably 2 to 4, R represents an oxygen moiety or two hydrogen atoms, X represents oxygen or sulfur, R' represents identical or different alkyl moieties of 1 to 8 carbon atoms which can be interrupted by an oxygen atom if desired, and $a$ can be equal to 0 or 1.

The preparation of the compounds of Formula I is generally performed in the manner described in German "Offenlegungsschrift" No. 2,159,991. The compounds of Formula II can be prepared, for example, by the reaction of the corresponding ω-halogenalkyltrialkoxysilanes with aminoacetals.

The silanes are generally used in the acid range. They thus become cleaved and form the corresponding diols or carbonyl-group-containing silanes. One can also use the silanes in the alkaline range, especially when an amine or melamine resin is used as the organic polymer. When the silane is employed in an acidic medium, this medium can be either a water solution or the resin in which the silane is incorporated; it has normally pH-values between 3.5 and 6.5. But other values below 7.0 can be accepted.

When the silane is employed in an alcaline medium, this medium is either a water solution with pH-values from 7.5 to 10.0 or a resin.

The following compounds are given as examples of the silanes:

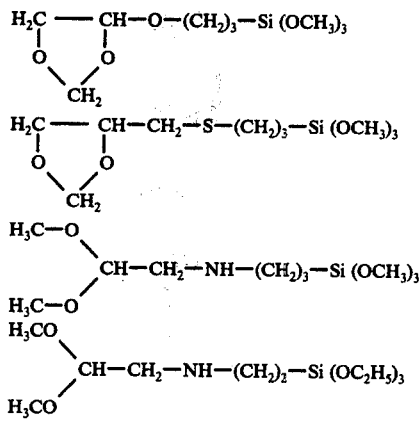

The laminates made from organic binding agents and inorganic oxides or metals with the use, in accordance with the invention, of silanes having capped functional groups display substantially improved mechanical strengths as a result of improved adhesion, as shown by wet strength measurements in bending experiments performed on standardized test specimens.

The organic binding agents whose adhesion to inorganic substrates is improved include polyaddition products, such as, for example, epoxy resins, urethane resins or polyester resins, polycondensation products, such as for example the cold setting and/or thermosetting resins obtained by the condensation of aldehydes with phenols and/or ureas or the derivatives thereof, and polymerization products, such as, for example, those based on polyvinylhalides and/or copolymers of vinyl chloride and vinyl acetate, ethylene and methacrylic acid esters. Also, the adhesion of polymers based on caprolactam or the adhesion of other polyamides can be improved in accordance with the invention.

Examples of components having inorganic, oxidic surfaces are glass, quartz, diatomaceous earth, sand, asbestos, mica, corundum, iron oxides, calcium carbonate, calcium sulfate, etc. Suitable metallic surfaces are, for example, those of iron, copper, zinc, aluminum, tin and titanium.

The inorganic components can be, for example, in the form of fibers, mats, rovings, powders, or fabrics, etc.; the metals are used, for example, in the form of powders, sheets or wires.

Of special technical interest is the pretreatment of glass fabrics and fibers and of glass surfaces and metal surfaces which are made into laminates with numerous organic polymers.

The commercial advantages of the invention can be achieved either by a treatment of the inorganic metallic substrates with the claimed silanes by applying them either by spraying, dipping, atomizing or brushing, or by adding the claimed silanes to the polymers as adhesivizing adjuvants.

If the silanes are applied directly to the surface, they are preferably used in the form of solutions. The solutions used contain the dissolved adhesivizer in a concentration of 0.05 to 5 wt.-%, preferably 0.1 to 2 wt.-%. The application of the silanes is performed preferably by immersing the products to be treated into the acid or alkaline solution of the silane. If an acid aqueous solution is used, then in the case of the compounds of the above-given Formula II, the acetal groups or ketal groups are transformed to aldehyde and diol groups, respectively.

Alcohols, ethers, benzines, chlorinated hydrocarbons and aromatic hydrocarbons can be used as solvents. Preferably, however, incombustible solvents are used, such as, for example, water and mixtures of water with the above-named organic solvents.

When the treatment with the silanes is completed, the impregnation can be followed by evaporation of the solvent and, if desired, a heat treatment for hardening purposes.

If, however, the silane is added to the organic polymer or is incorporated into the polymer by known methods prior to the addition of the inorganic materials, the silane concentrations in the polymer can be between 0.05 and 10% by weight, preferably 0.1 to 2% by weight, with respect to the polymer, depending on the size of the surface area of the inorganic substances. The amount to be used in each case depends on the nature of the binding agents used and on the inorganic material.

In the case of cold-setting furan resins for example, which are used as binding agents in foundry molds and cores, amounts between 0.1 and 0.3% by weight are added. For the incorporation of the silanes into the binder it is sufficient to mix them with the resin by known methods such that a uniform distribution is brought about.

The mixture of the resins with the named silanes has an additional advantage over resin-aminosilane mixtures. The shelf life of these mixtures, especially when a phenol resol resin is used as the resin, is significantly better than in the case of comparable resins to which silanes containing amino groups have been added.

In order to more fully illustrate the nature of the invention and the manner of practicing the same the following examples are presented:

EXAMPLES

EXAMPLE 1

Water-sized glass fibers are immersed for one minute in a 0.25% solution of $(CH_3-CH_2-O)_2-CH-CH_2-NH-CH_2-CH_2-CH_2-Si(OCH_3)_3$ which has been acidified with acetic acid. Then, after allowing the excess solution to drain off, the fibers are dried for 15 minutes at 130° C.

The glass filaments sized in this manner are then dipped in epoxy resin and made into round fiber-reinforced rods. The curing of these rods is performed at 130° C. for 17 hours. The bending strength of the test specimens obtained in this manner is determined in accordance with DIN 53 452, one determination being performed directly after curing and the other after letting specimens stand in boiling water for 72 hours.

A test specimen prepared in the same manner, but reinforced with glass filaments sized with ω-aminopropyltriethoxysilane, was used for purposes of comparison. The blank specimen contains only water-sized glass filaments. The results are given in the following table.

| BENDING STRENGTH OF GLASS FIBER-REINFORCED EPOXY RODS (in kp/cm²) | | |
|---|---|---|
| | Bending strength | |
| Silane used | Directly after curing | After standing in water |
| None | 9800 | 3500 |
| $H_2N(CH_2)_3-Si(OC_2H_5)_3$ | 9500 | 7900 |
| $(C_2H_5-O)_2-CH-CH_2-NH-(CH_2)_3-Si(OCH_3)_3$ | 11400 | 9600 |

EXAMPLE 2

1000 weight-parts of Halterner Sand H 32 are mixed thoroughly with 15 weight-parts of a furan resin containing 0.3 wt.-% of adhesivizing agent, and 6 weight-parts of a hardener (75% $H_3PO_4$). The mixture is charged into a +GF+ test bar mold and compressed with three blows of the ram of a +GF+ ram apparatus. Then the bars are allowed to set at room temperature, the initial bending strength being tested 5 hours later by means of the +GF+ strength testing apparatus.

The second half of the bars is exposed for 24 hours to a water-vapor-saturated atmosphere and then subjected to the bending test.

The following are used as the adhesivizing agents:

$(H_5C_2O)_2-CH-CH_2-NH-(CH_2)_3-Si(OCH_3)_3$ (Experiment a)

-continued

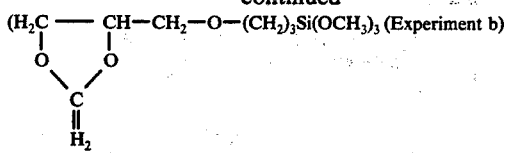 (Experiment b)

The results are given in the following table:

| Resin component + silane (Experiment No.) | Bending strength of test bars (in kp/cm²) | |
|---|---|---|
| | After 5 h | After 5 h plus 24 h exposure to moisture |
| 0 (no silane) | 16 | 12 |
| a | 35 | 36 |
| b | 33 | 25 |

EXAMPLE 3

Degreased copper plates measuring 15 × 8 cm were repeatedly dipped into a 10% alcoholic acetic acid solution of 4-3'-trimethoxysilylpropoxymethyl)-1,3-dioxolane and then dried for one hour at 130° C. On the surface there is then a firmly adherent, hard film, which cannot be removed by scratching with a knife.

What is claimed is:

1. A process for protecting the surface of an inorganic oxidic or metallic surface against corrosion or for improving its adhesion to an organic polymeric material which comprises contacting said surface an aqueous solution of a silane having a capped functional group, said silane being one of those having the following formulas:

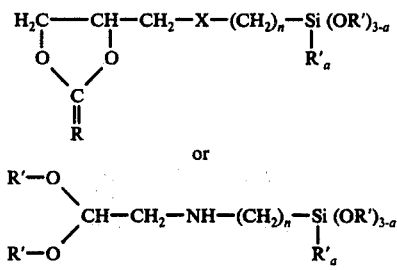

wherein
$n = 1$ to 8,
$a$ can be equal to 0 or 1,
R represents oxygen or 2 hydrogen atoms,
X represents oxygen or sulfur, and
R' represents identical or different alkyl moieties which can be interrupted in the chain by an oxygen atom,
the silane being applied in the form of a 0.05 to 5.0 weight percent solution and thereafter removing the aqueous solvent.

2. A process according to claim 1 wherein $n = 2$ to 4.

3. A process according to claim 1 wherein the silane of the following formula is employed

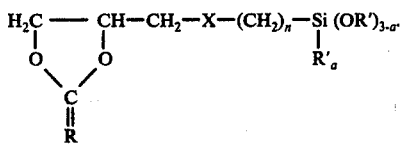

4. A process according to claim 1 wherein the silane of the following formula is employed

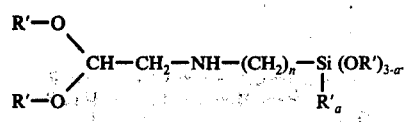

5. A laminate comprising an inorganic oxidic or metallic surface and a polymer, said laminate having in the region of the interface between the inorganic oxidic or metallic surface and the polymer a silane having a capped functional group said silane being one having the following formulas:

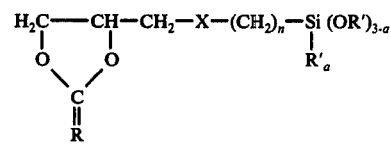

or

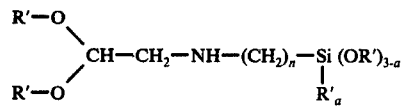

wherein $n = 1$ to 8, $a$ is equal to 0 or 1, R represents an oxygen moiety or 2 hydrogen atoms, X represents oxygen or sulfur and R' represents identical or different alkyl moieties which can be interrupted by an oxygen atom.

6. A laminate according to claim 5 where $n$ is 2 to 4.

7. A laminate according to claim 5 wherein the silane is present in the amount of 0.05 to 10 percent by weight based upon the weight of the polymer.

8. A laminate according to claim 7 wherein the silane has the formula

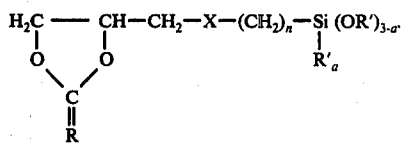

9. A laminate according to claim 5 wherein the silane has the formula

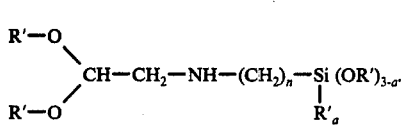

10. A laminate according to claim 5 wherein the polymer is an epoxy resin.

11. A laminate according to claim 5 wherein the polymer is a furan resin.

12. An object having an inorganic oxidic or metallic surface said object having on said surface a coating of a silane having a capped functional group wherein the silane has one of the following formulas

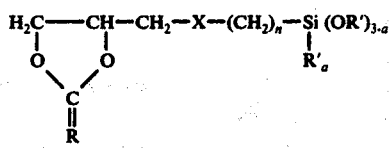

or

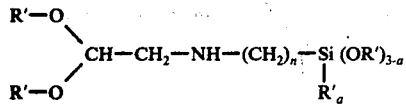

wherein $n = 1$ to 8, $a$ can be equal to 0 or 1, R represents oxygen or 2 carbon atoms, X represents oxygen or sulfur and R' represents identical or different alkyl moieties which can be interrupted in the chain by an oxygen atom.

13. A process according to claim 1 wherein to the surface containing the silane there is applied a cold-setting resin and thereafter the resultant laminate is cured.

* * * * *